US011689042B2

(12) United States Patent
Liang et al.

(10) Patent No.: US 11,689,042 B2
(45) Date of Patent: Jun. 27, 2023

(54) DEVICE AND METHOD FOR CHARGING A BATTERY DISCHARGED BEYOND AT LEAST ONE OPERATING THRESHOLD

(71) Applicant: Renesas Electronics America Inc., Milpitas, CA (US)

(72) Inventors: Zhigang Liang, Fremont, CA (US); Byongho Park, Cary, NC (US); Mehul Shah, Cary, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 170 days.

(21) Appl. No.: 17/033,541

(22) Filed: Sep. 25, 2020

(65) Prior Publication Data

US 2021/0119467 A1    Apr. 22, 2021

Related U.S. Application Data

(60) Provisional application No. 62/915,862, filed on Oct. 16, 2019.

(51) Int. Cl.
*H02J 7/00*    (2006.01)

(52) U.S. Cl.
CPC ...... *H02J 7/007182* (2020.01); *H02J 7/0048* (2020.01); *H02J 7/0069* (2020.01)

(58) Field of Classification Search
CPC .. H02J 7/007182; H02J 7/0048; H02J 7/0069; H02J 7/00306
USPC .................................................. 320/134–136
See application file for complete search history.

(56) References Cited

U.S. PATENT DOCUMENTS

| 4,609,860 A * | 9/1986 | Fasen | H02J 7/008 320/113 |
| 4,885,523 A * | 12/1989 | Koenck | H02J 7/0091 320/149 |
| 5,471,128 A * | 11/1995 | Patino | H02J 7/00038 320/128 |
| 6,734,652 B1 * | 5/2004 | Smith | H02J 7/00718 320/163 |
| 2010/0231170 A1 * | 9/2010 | Davis | H02J 7/0031 320/136 |
| 2012/0319659 A1 * | 12/2012 | Kinoshita | H01M 4/525 320/134 |
| 2016/0299560 A1 * | 10/2016 | Kondo | G06F 1/3212 |
| 2020/0266647 A1 * | 8/2020 | Ramachandran | H02J 7/0068 |

* cited by examiner

*Primary Examiner* — David V Henze-Gongola
(74) *Attorney, Agent, or Firm* — Foley & Lardner LLP

(57) ABSTRACT

Example implementations include obtaining charging power from a power source, obtaining a charging command, activating a trickle current to a battery, entering a first charging state in response to a condition that a voltage of the battery does not satisfy a deep discharge threshold, and entering a second charging state in response to a condition that a voltage of the battery satisfies a deep discharge threshold. Example implementations can further include supplying the trickle current in a burst to the battery in response to a condition that the voltage of the battery does not satisfy a fuel gauge threshold, upon entering the second charging state. Example implementations can further include supplying the trickle current continuously to the battery in response to a condition that the voltage of the battery satisfies the fuel gauge threshold, upon entering the second charging state.

18 Claims, 5 Drawing Sheets

DEVICE AND METHOD FOR CHARGING A BATTERY DISCHARGED BEYOND AT LEAST ONE OPERATING THRESHOLD

CROSS-REFERENCE TO RELATED PATENT APPLICATIONS

This application claims priority to U.S. Provisional Patent Application Ser. No. 62/915,862, entitled "Solution to Wake Up Deeply Discharged Battery Pack," filed Oct. 16, 2019, the contents of such application being hereby incorporated by reference in its entirety and for all purposes as if completely and fully set forth herein.

TECHNICAL FIELD

The present embodiments relate generally to battery chargers, and more particularly to charging a battery discharged beyond at least one operating threshold.

BACKGROUND

Deep discharge of a battery may include discharge of a battery below one or more critical operating thresholds. Deep discharge may prevent the battery from receiving further charge, thus preventing the battery from returning to a state above one or more critical operating thresholds. Thus there exists a need for charging a battery discharged beyond at least one operating threshold.

SUMMARY

Example implementations include obtaining charging power from a power source, obtaining a charging command, activating a trickle current to a battery, entering a first charging state in response to a condition that a voltage of the battery does not satisfy a deep discharge threshold, and entering a second charging state in response to a condition that a voltage of the battery satisfies a deep discharge threshold. Example implementations can further include supplying the trickle current in a burst to the battery in response to a condition that the voltage of the battery does not satisfy a fuel gauge threshold, upon entering the second charging state. Example implementations can further include supplying the trickle current continuously to the battery in response to a condition that the voltage of the battery satisfies the fuel gauge threshold, upon entering the second charging state.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1:
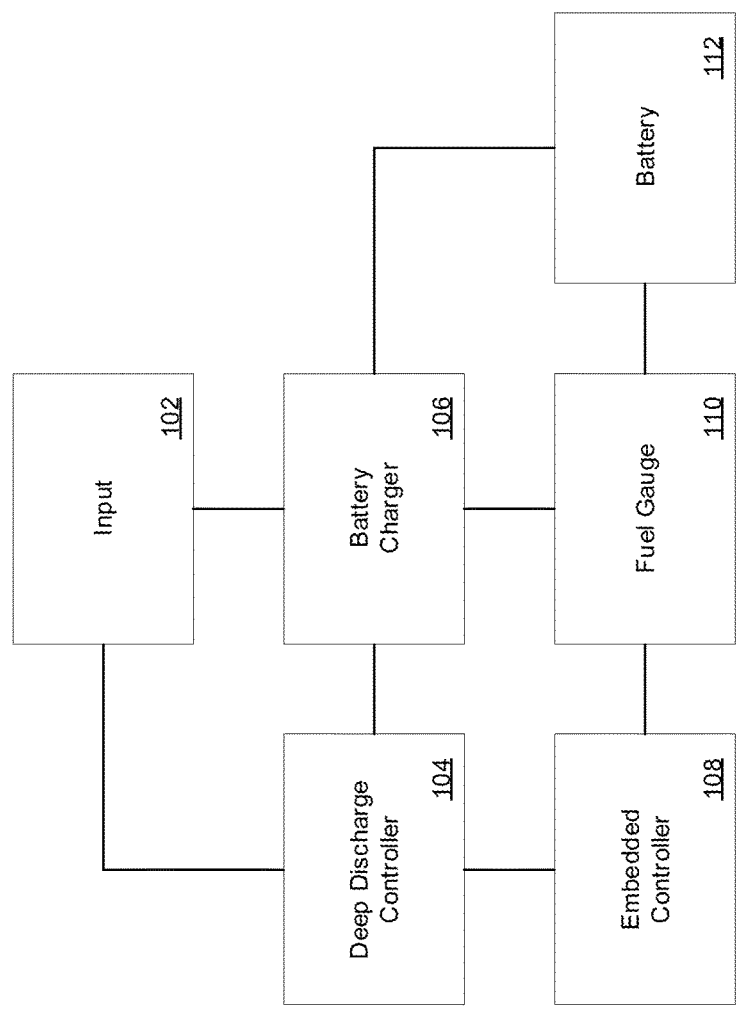
FIG. 1 illustrates an exemplary deep discharge battery charger system in accordance with present implementations.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

In some implementations, voltage of a battery is sufficiently low to impede charging of the battery. In some implementations, one or more electronic devices operate at an activation voltage that is higher than a minimum, operating, or like voltage of a battery. As one example, an exemplary system includes one or more electronic devices requiring a voltage of 4V for normal operation, and includes a battery operable at one or more voltages below 4V. In some implementations, an electronic device includes a fuel gauge integrated circuit. As another example, an exemplary system includes a fuel gauge integrated circuit requiring a voltage of 4V for normal operation, and includes a battery operating at 2V. This exemplary condition is present in some implementations including two battery packs. It is to be understood that this exemplary condition is present in some implementations including an arbitrary number of batteries, and is not limited to any number of batteries as disclosed by example herein. Thus, in some implementations, an exemplary system can operate to charge a battery at a voltage below normal operating voltage of one or more electronic, electrical, or like devices associated with charging the battery. In some implementations, a system or device state including a battery at a voltage below normal operating voltage of one or more electronic, electrical, or like devices is a deeply discharged state.

FIG. 1 illustrates an exemplary deep discharge battery charger system in accordance with present implementations. As illustrated in FIG. 1, an exemplary system 100 includes an input 102, a deep discharge controller 104, a battery charger 106, an embedded controller 108, a fuel gauge 110, and a battery 112.

The input 102 includes a source of electrical power, voltage, current, or the like for supplying power to the system 100. In some implementations, the input 102 includes, but is not limited to regulated 120 V AC power, regulated 220V AC power, 4V DC power, 12V DC power, or the like. In some implementations, the input 102 includes a wired power connection, a wireless direct contact power connection, a wireless and contactless power connection, the like, or any power connection as is known or may become known. In some implementations, the input 102 includes one or more USB terminals or ports (e.g., USB-C, USB-PD).

The deep discharge controller 104 includes one or more electrical, electronic, logical, or like devices for supplying tickle current to the exemplary system 100. In some implementations, the deep discharge controller 104 includes an integrated circuit. In some implementations, the deep discharge controller 104 include a current source operable to output at least a fixed DC current to one or more components of the exemplary system 100. In some implementations, the deep discharge controller 104 is directly or indirectly operably coupled to at least one of the battery and battery control devices, logic, and the like. In some implementations, the deep discharge controller directly or directly receives one or more characteristics from one or more components of the exemplary system 100. As one example, the deep discharge circuit can receive voltage feedback from the battery 112.

The battery charger 106 includes one or more electrical, electronic, logical, or like devices for applying charge to the battery 130. In some implementations, battery charger 106 includes one more electrical circuits, digital electronic devices, analog electronic devices, integrated circuit devices, or the like as are known or may become known. In some implementations, battery charger 106 receives electrical feedback from at least one of the fuel gauge 110 and the battery 112. In some implementations, the battery charger 106 includes one or more electrical, electronic, logical, or like devices for generating at least one control signal for operating at least one of the fuel gauge 110 and the battery 112. In some implementations, the deep discharge controller is integrated with, integrable with, included with, included within, or the like, the battery charger 106. In some implementations, at least one integrated circuit includes at least one of the deep discharge controller 104 and the battery charger 106.

The embedded controller 108 includes one or more electrical, electronic, logical, or like devices for controlling one or more components of the exemplary system 100. In some implementations, the embedded controller 108 includes one or more integrated circuits and one or more logical or electrical control lines, leads, buses, connections, connectors, devices, circuits, and the like operatively coupling the embedded controller 108 to one or more components of the exemplary system 100. In some implementations, the embedded controller 108 is operably coupled by one or more of bidirectional, unidirectional, half duplex, full duplex or like communication channels. In some implementations, the embedded controller 108 is operably coupled to receive feedback, sensor, calibration, or like input from one or more components of the exemplary system 100.

The fuel gauge 110 includes one or more one or more electrical, electronic, electromechanical, electrochemical, or like devices or systems for charging or discharging the battery 112. In some implementations, the fuel gauge 110 includes a DC-DC power converter. In some implementations, the fuel gauge 110 includes an inductive charger. An inductive charger may be, but is not limited to, a buck charger, a boost charger, a buck-boost charger, a combination thereof, or the like. In some implementations, the fuel gauge 110 is an integrated circuit including one or more inputs for receiving input from one or more of voltage, current, analog feedback, digital feedback, analog sense signal input, digital sense signal input, enable signals, or the like. In some implementations, the fuel gauge 110 includes one or more logical, electrical, electronic, electromechanical, electrochemical, or like components for computing, modifying, transforming or the like. In some implementations, the fuel gauge 110 is operable to control, be controlled by, or respond to one or more of the components of the exemplary system 100, at least in part on logic therein or therewith.

The battery 112 includes one or more electrical, electronic, electromechanical, electrochemical, or like devices or systems for at least one of receiving, storing and distributing input power. In some implementations, the battery 112 includes one or more stacks of batteries. In some implementations, the battery 112 includes lithium-ion or like energy storage. In some implementations, the battery 112 is integrated with, integrable with, or separable from the system 100. In some implementations, the battery 112 includes a plurality of battery units variously or entirely integrated with, integrable with, or separable from the system 100.

Figure 2A:
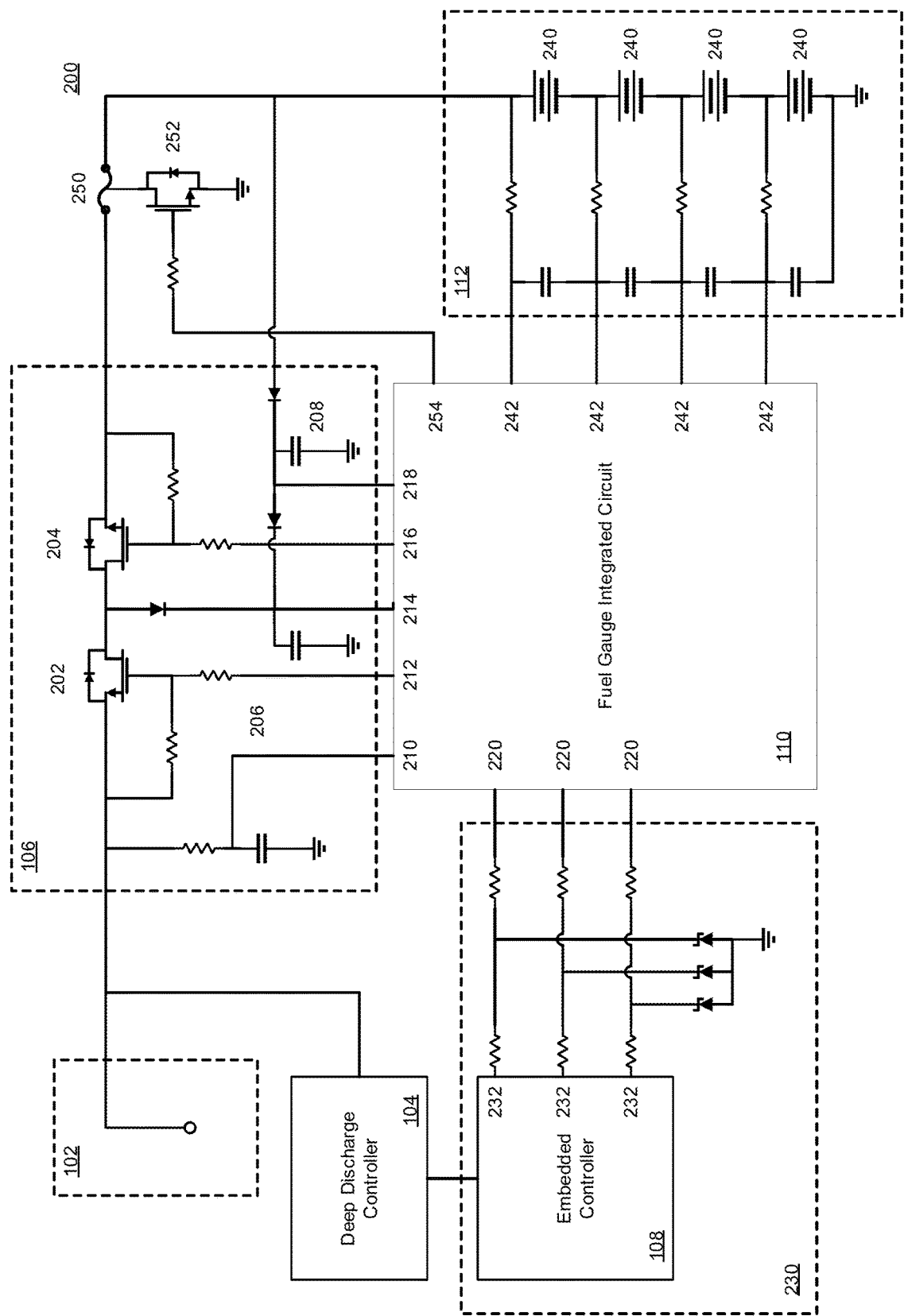
FIG. 2A illustrates an exemplary deep discharge battery charger device in accordance with present implementations.

FIG. 2A illustrates an exemplary deep discharge battery charger device in accordance with present implementations. In some implementations, the exemplary device 200 includes one or more discrete electrical, electronic, or like elements assembled on a printed circuit board or the like. In some implementations, one or more elements of the exemplary device 200 is fabricated in an integrated circuit or multiple integrated circuits assembled on a printed circuit board or the like. In some implementations, one or more portions or components of the exemplary device 200 are implemented in one or more programmable or reprogrammable devices or systems. While various devices are described by way of example as power MOSFETs, it is to be understood that exemplary systems in accordance with the present implementations may include one or more transistors of various types in addition to or instead of power MOSFETs. Exemplary transistors of various types include, but are not limited to, FETs, MOSFETs, IGBTs, and BJTs as are known or may become known. As illustrated in FIG. 2, an exemplary device 200 includes the input 102, the deep discharge controller 104, the battery charger 106, an embedded controller region 230, the fuel gauge 110, the battery 112, a fuse 250, and a fuse transistor 252.

The battery charger 106 of the device 200 includes a discharge transistor 202, a charge transistor 204, an input bypass capacitor 206 and a battery bypass capacitor 208. In some implementations the discharge transistor 202 is a discharge FET ("DFET") and the charge transistor 204 is a charge FET ("CFET"). The DFET 202 can activate and deactivate a discharge connection between the battery and one or more components of the device 200. The CFET 204 can activate and deactivate a charge connection between the battery and one or more components of the device 200. In some implementations, the CFET 204 is activated to operably couple the input 102 to the battery 112 in response to receiving at least one of a charging voltage input and a charging current input. In some implementations, the DFET 202 is operable to transmit at least one of the charging voltage input and the charging current input to the CFET by a body diode disposed therein. In some implementations, the input bypass capacitor 206 and the battery bypass capacitor 208 are operatively coupled to each other and to the DFET 202 and the battery 112. In some implementations, the input bypass capacitor 206 is responsive to change in state of the device 200 between one or more charging states. In some implementations, the battery bypass capacitor 208 is responsive to change in state of the device 200 between one or more charging states.

The embedded controller region 230 includes the embedded controller 108 and one or more communication lines operatively coupled therewith. The fuel gauge 110 of the device 200 includes a plurality of battery charger interface pins, a plurality of battery interface pins, and a plurality of embedded controller interface pins. The battery charger interface pins include a first input voltage pin VIN 210, a DFET 202 output pin DFOUT 212, a system voltage pin VCC 214, a CFET 204 output pin CFOUT 216, and a battery voltage output pin VBAT 218. In some implementations, VIN 210 is operatively coupled to the input 102 to receive a power signal for operating one or more component of the fuel gauge integrated circuit 110 or a component, device, system, or the like connected thereto or therewith.

In some implementations, VCC 214 is operatively coupled to the DFET 202 and the CFET 204 at a source terminal of each device. In some implementations, a diode is disposed between VCC 214 and a node coupled to corresponding terminals of the DFET 202 and the CFET 204. In some implementations, VCC 214 is operable to receive operating voltage, system voltage, or the like for operating the fuel gauge circuit 110. In some implementations, VBAT 218 is operatively coupled to VCC 214, the battery 112. In some implementations, VCC 214 and VBAT 21 can enable one or more of the fuel gauge integrated circuit 110, the embedded controller 108, and the deep discharge controller 104 to respond to conditions including but not limited to voltage of the battery 112 associated with a deep discharge threshold and voltage of the battery 112 associated with a fuel gauge threshold. In some implementations, DFOUT 212 is operatively coupled to a gate terminal of the DFET 202. In some implementations, CFOUT 216 is operatively coupled to a gate terminal of the CFET 204.

The battery 112 of the device 200 includes at least one battery cell 240 operatively coupled to the fuel gauge integrated circuit 110, and to the battery charger 106 by the CFET 204. In some implementations, the battery 112 includes a plurality of battery cells 240 each arranged in series, and including a corresponding resistor and capacitor (RC) circuit coupled to the fuel gauge integrated circuit 110.

The exemplary fuel gauge integrated circuit 110 further includes battery pins 242 and embedded controller pins 232, and a system fuse output pin FUSEOUT 254. The plurality of battery interface pins include the plurality of battery pins 242. In some implementations, each of the battery pins is operably coupled to a corresponding battery cell 240 of the battery 112. In some implementations, each of the battery pins 242 is each of the battery pins 242 is operable to detect at least one power characteristic associated with its corresponding battery cell 240. As one example, a battery pin 242 can detect voltage at a positive terminal of its corresponding battery cell 240. In some implementations, the plurality of embedded controller interface pins include the plurality of embedded controller pins 220. In some implementations, the embedded controller pins 220 are operably coupled to the embedded controller 108. The embedded controller pins 220 are operable to receive and transmit communication with the embedded controller 108.

In some implementations, the device 200 includes a fuse portion including a fuse 250 and a fuse switch 252. In some implementations, the fuse 250 is displayed along the charging path between the CFET 204 and the battery 112, and is operatively coupled to the fuel gauge integrated circuit 110 at FUSEOUT 254. In some implementations, fuse 250 is operable to electrically isolate CFET 204 from the battery 112. In some implementations, FUSEOUT 254 is operable to detect a change in state of the fuse 250.

Figure 2B:
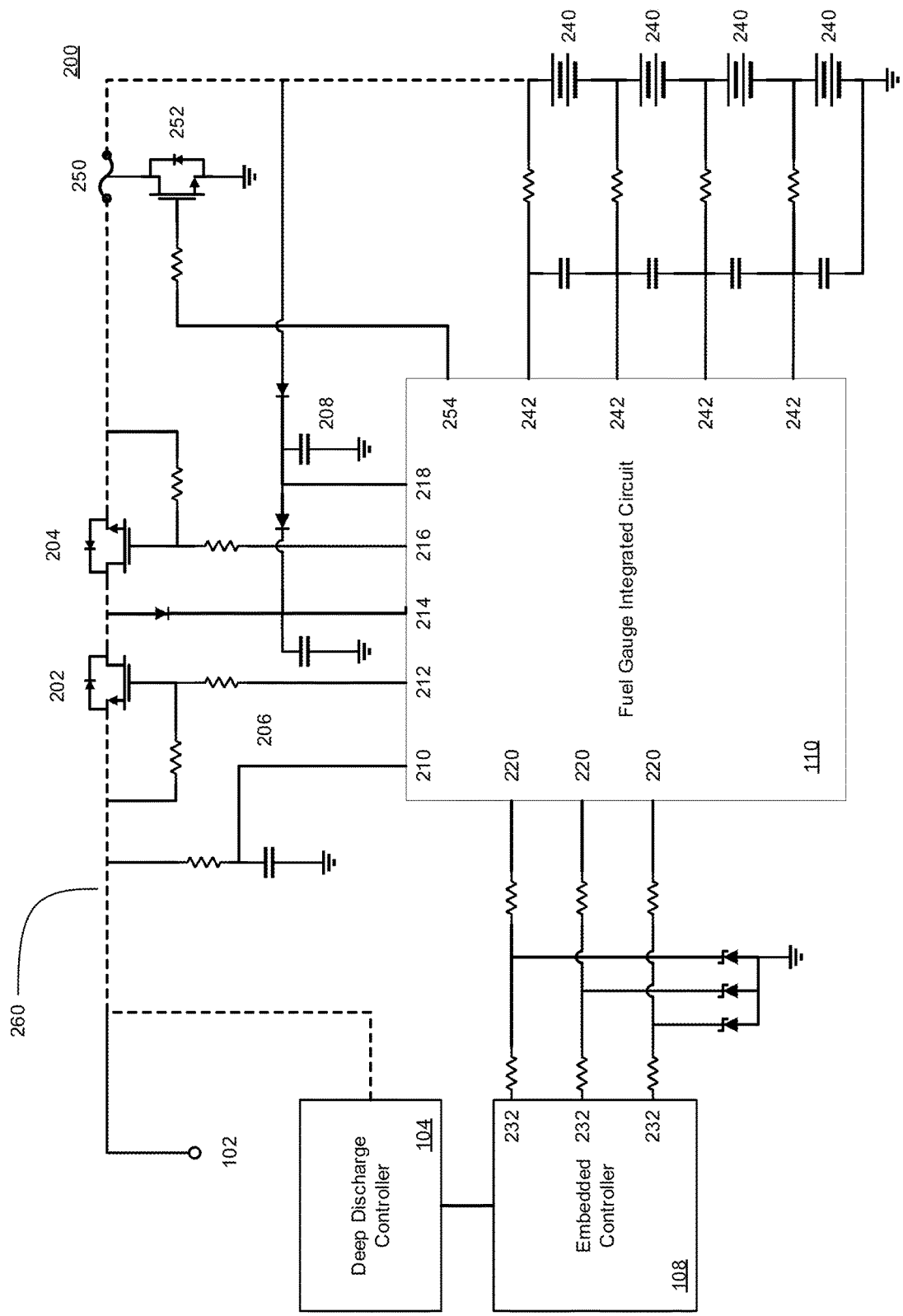
FIG. 2B illustrates an exemplary deep discharge battery charger device including an exemplary trickle current path in accordance with present implementations.

FIG. 2B illustrates an exemplary deep discharge battery charger device including an exemplary trickle current path in accordance with present implementations. As illustrated by way of example in device 200 of FIG. 2B, the deep discharge controller 104 can supply a trickle current to the battery 112 via the charging path 260. The charging path 260 can electrically connect the deep discharge controller 104 to the battery 12 in response to activation of CFET 204. In some implementations, the deep discharge controller applies the trickle current continuously to the battery 112 along the charging path 260. In some implementations, the deep discharge controller applies the trickle current in one or more bursts to the battery 112 along the charging path 260 in a deep discharge state of the device 200. Alternatively, in some implementations, the deep discharge controller applies the trickle current continuously to the battery 112 along the charging path 260, while the fuel gauge integrated circuit oscillates between on and off states in a deep discharge state. This oscillation can cause the trickle current to be applied in bursts to the battery in a deep discharge state.

Figure 3:
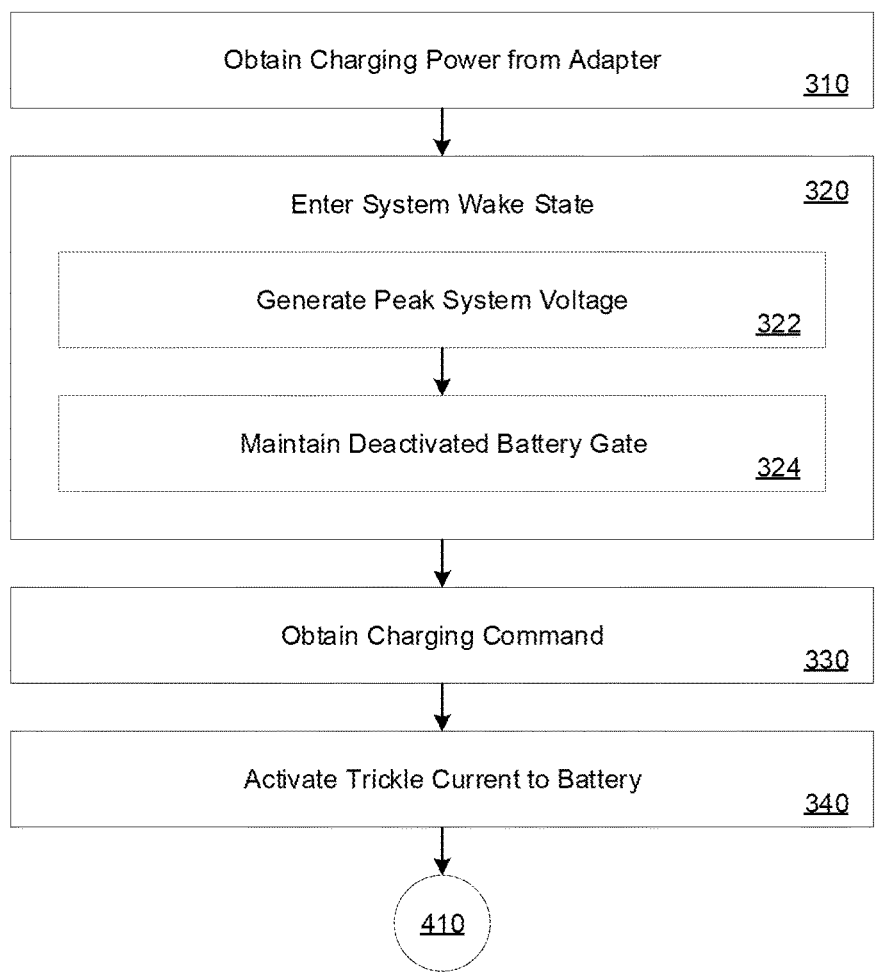
FIG. 3 illustrates an exemplary method for deep discharge battery charging in accordance with present implementations.

FIG. 3 illustrates an exemplary deep discharge battery charging method in accordance with present implementations. In some implementations, at least one of the exemplary system 100 and the exemplary device 200 performs method 300 according to present implementations. At step 310, the method 300 begins.

At step 310, the exemplary system obtains power. In some implementations, the exemplary system obtains power from an external power device, including but not limited to, an external power adapter. The method 300 then continues to step 320.

At step 320, the exemplary system enters a wake state. A wake state can include, but is not limited to, one or more of a startup, boot, power up, restart, reboot, or like state. A wake state can include, but is not limited to a wake operating to, with or for an entire system 100 or device 200, or a portion thereof. In some implementations, step 320 includes one or more of step 322 and 324. At step 322 the exemplary system generates a peak system voltage. A peak system voltage can include, but is not limited to, a maximum voltage, an ideal voltage, or the like associated with one or more components of the system 100 or the device 200. In some implementations, the peak system voltage is a voltage for normal operation of the system 100 or the device 200. In some implementations, normal operations is a state excluding a deep discharge state. At step 324, the exemplary system maintains a deactivated battery gate. In some implementations, maintaining a deactivated battery gate includes deactivating the battery gate. In some implementations, a battery gate is a transistor, switch, or the like integrated into an electronic device. In some implementations, the battery gate is integrated into in the fuel gauge integrated circuit 110. The method 300 then continues to step 330.

At step 330, the exemplary system obtains a charging command. In some implementations, the exemplary system obtains the charging command from the embedded controller 108. In some implementations, the exemplary system obtains the charging command at the deep discharge controller 104. In some implementations, the charging command includes at least one instruction to activate, maintain, modify, or deactivate a trickle current. The charging instruction can include, but is not limited to, one or more analog or digital instructions transmitted through the embedded controller portion 230. The method 300 then continues to step 340. At step 340, the exemplary system activates the trickle current. In some implementations, deep discharge controller supplies the trickle current. In some implementations, the trickle current includes a 10 mA DC current component. The method 300 then continues to step 410.

Figure 4:
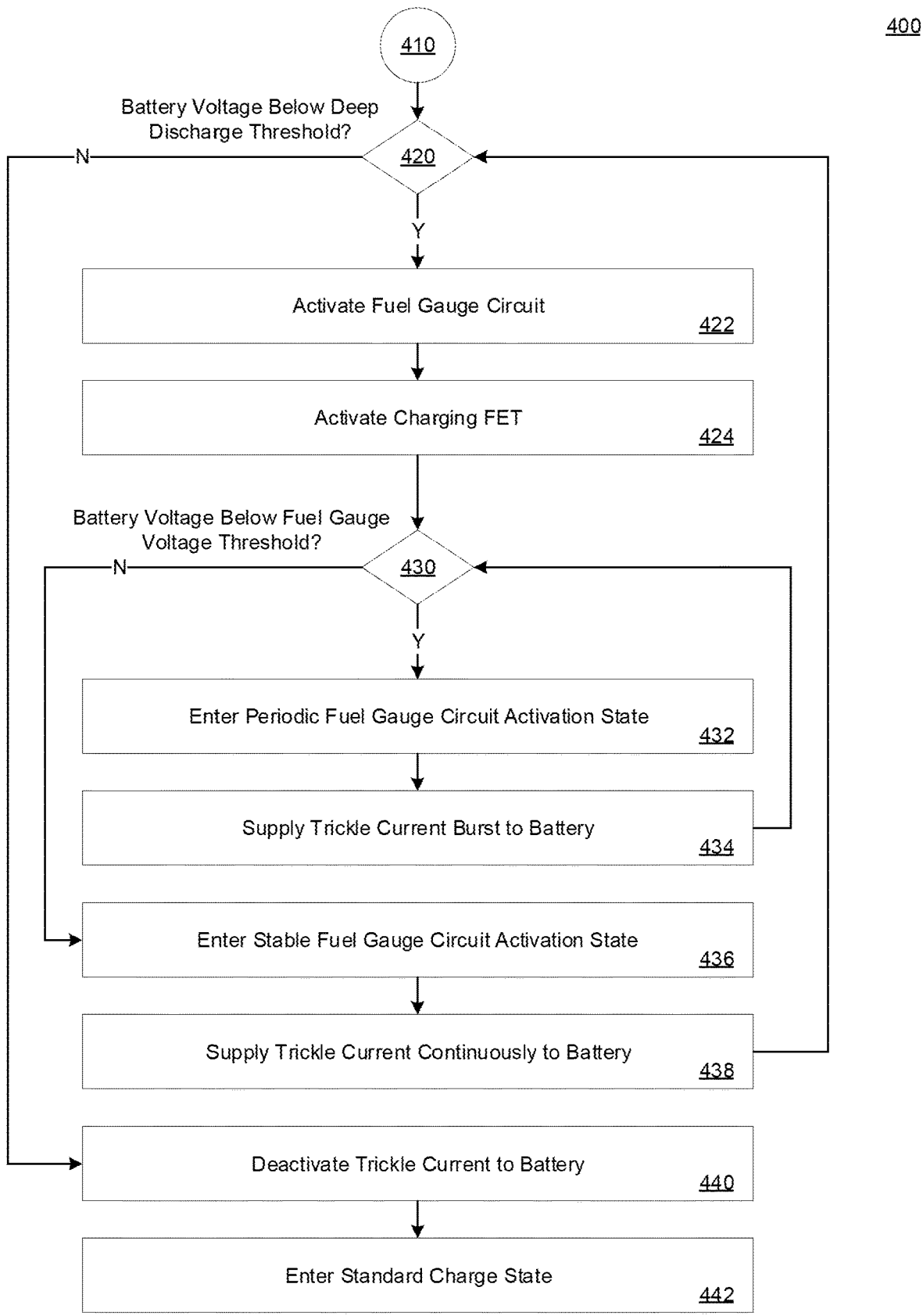
FIG. 4 illustrates an exemplary method for deep discharge battery charging further to the exemplary method of FIG. 3 and in accordance with present implementations.

FIG. 4 illustrates an exemplary deep discharge battery charging method further to the exemplary method of FIG. 3 and in accordance with present implementations. In some implementations, at least one of the exemplary system 100 and the exemplary device 200 performs method 400 according to present implementations. At step 410, the method 400 begins. The method 400 then continues to step 420.

At step 420, the exemplary system responds to a condition indicating whether voltage of the battery satisfies a deep discharge threshold. In some implementations, the deep discharge threshold is a voltage threshold indicating a minimum voltage of the battery. In some implementations, the fuel gauge 110 receives one or more voltages from one or more battery cells 240 of the battery 112. The fuel gauge 110 can respond to the received voltage or voltages. In some implementations, the fuel gauge 110 generates an output representing a response or determination based on the voltage of the battery 112 or the battery cells 240 thereof. In response to a condition that the voltage of the battery satisfies the deep discharge threshold, the method 400 continues to step 422. Alternatively, in response to a condition that the voltage of the battery does not satisfy the deep discharge threshold, the method 400 continues to step 440.

At step 422, the exemplary system activates a fuel gauge circuit. In some implementations, the deep discharge controller 104 and the battery charger 106 activate the fuel gauge controller by supplying activation power to the fuel gauge via the input 102. In some implementations, the activation power includes an activation voltage above a particular activation threshold voltage of the fuel gauge 110. The method 400 then continues to step 424.

At step 424, the exemplary system activates the charging FET. In some implementations, the fuel gauge 110 activates the charging FET CFET 204 by applying an activation signal voltage to the gate of the CFET 204 by CFOUT 216. The CFET 204 can thus electrically couple the input 102 and the deep discharge controller 104 to the battery 112. The body diode of the DFET 202 allows the DFET 202 to couple the CFET 204 to the input 102 and the deep discharge controller 104 regardless of the activation state or the deactivation state of the DFET 202. The method 400 then continues to step 430.

At step 430, the exemplary system responds to a condition indicating whether voltage of the battery satisfies a fuel gauge threshold. In some implementations, the fuel gauge threshold is a voltage threshold indicating a minimum activation voltage of the fuel gauge 110. In some implementations, the fuel gauge 110 responds by either activating or deactivating based on the fuel gauge threshold. The activating and deactivating of the fuel gauge based on the fuel gauge threshold can be instantaneous or can be delayed in response to the fuel gauge threshold. In some implementations, the fuel gauge threshold can deactivate at a time subsequent to receiving a supply voltage at VCC 214 not satisfying the fuel gauge threshold. As one example, the deactivation of the fuel gauge 100 in this case can be due to hysteresis or the like in the exemplary system. In response to a condition that the voltage of the battery satisfies the fuel gauge threshold, the method 400 continues to step 432. Alternatively, in response to a condition that the voltage of the battery does not satisfy the fuel gauge threshold, the method 400 continues to step 440.

At step 432, the exemplary system enters a periodic fuel gauge activation state. In some implementations, the periodic fuel gauge activation state occurs in response to activation of the fuel gauge 110 while voltage of the battery 112 is below the fuel gauge threshold. In some implementations, the periodic fuel gauge activation state includes an oscillating state in which an initial activation voltage applied to the fuel gauge 110 is pulled down to the battery 112 have a voltage below the fuel gauge threshold. The method 400 then continues to step 434.

At step 434, the exemplary system supplies a trickle current burst to the battery. In some implementations, the deep discharge controller 104 supplies the trickle current. In some implementations, the battery receives the trickle current to charge the battery gradually up to the fuel gauge threshold. In some implementations, the battery 112 receives the trickle current in one or more bursts while the fuel gauge 110 activates and subsequently deactivates. The deep discharge controller 104 can thus gradually charge the battery 112 even while the battery 112 supplies a voltage below the fuel gauge threshold to the fuel gauge 110. In some implementations, step 432 includes all or part of step 434. The method 400 then continues to step 430.

At step 436, the exemplary system enters a stable fuel gauge activation state. In some implementations, the periodic fuel gauge activation state occurs in response to activation of the fuel gauge 110 while voltage of the battery 112 is at or above the fuel gauge threshold. In some implementations, the stable fuel gauge activation state begins as the battery 112 is charged by the trickle current from the deep discharge controller 104 to reach a voltage at or above the fuel gauge threshold. The method 400 then continues to step 438.

At step 438, the exemplary system supplies a trickle current continuously to the battery. In some implementations, the battery receives the trickle current to charge the battery gradually and continuously up to the fuel gauge threshold. In some implementations, the battery 112 receives the trickle current continuously while the fuel gauge 110 activates and remains activated in response to a voltage of the battery 112 at or above a fuel gauge threshold. Thus, the deep discharge controller 104 can transition the exemplary system out of a deep discharge state in which the battery 112 prevents the fuel gauge from continuously activating. In some implementations, step 436 includes all or part of step 438. The method 400 then continues to step 420.

At step 440, the exemplary system deactivates the trickle current to the battery. In some implementations, one or more of the deep discharge controller 104, the embedded controller 108, and the fuel gauge 110 deactivates the trickle current to the battery. In some implementations, the exemplary system deactivate the trickle current to the battery in response to the battery 112 reaching or exceeding a voltage corresponding to a deep discharge threshold. Thus, the deep discharge controller 104 can also transition the exemplary system out of a deep discharge state in which the battery 112 is deeply discharged, and is nonetheless sufficiently charged that the fuel gauge 110 can activate continuously. The method then continues to step 442.

At step 442, the exemplary system enters a standard charging state. In some implementations, the standard charging state including supplying at least one of a charging voltage, charging current, charging power, and the like to the battery 112 other than the trickle current. In some implementations, the battery charges in response to input from the input 102. In some implementations, the battery 112 charges based on input from an external power adapter operatively coupled to the input 102. In some implementations, the method 400 ends at step 442.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   activating a trickle current to a battery;
   in response to a condition that a voltage of the battery does not satisfy a deep discharge threshold, entering a first charging state;
   in response to a condition that a voltage of the battery satisfies a deep discharge threshold, entering a second charging state;
   in response to a condition that the voltage of the battery does not satisfy a fuel gauge threshold, supplying the trickle current in a burst to the battery; and
   in response to a condition that the voltage of the battery satisfies the fuel gauge threshold, supplying the trickle current continuously to the battery.

2. The method of claim 1, wherein the entering the second charging state comprises:
   obtaining charging power from a power source.

3. The method of claim 2, wherein the entering the second charging state further comprises:
obtaining a charging command.

4. The method of claim 3, wherein the entering the second charging state further comprises:
activating a fuel gauge circuit operatively coupled to the battery.

5. The method of claim 4, wherein the fuel gauge threshold comprises an activation voltage of the fuel gauge circuit.

6. The method of claim 1, further comprising:
in further response to the condition that the voltage of the battery does not satisfy the deep discharge threshold, deactivating the trickle current to the battery.

7. The method of claim 1, wherein the deep discharge threshold comprises an activation voltage of the battery.

8. The method of claim 1, further comprising:
entering a system wake state.

9. The method of claim 8, wherein the entering the system wake state comprises:
generating a peak system voltage; and
electrically isolating the battery from a power source.

10. A device comprising:
a battery charger circuit operably coupled to a battery;
a deep discharge controller circuit operably coupled to the battery charger circuit, the deep discharge controller circuit operable to obtain a charging command, to activate a trickle current to a battery, to respond to a condition that a voltage of the battery does not satisfy a deep discharge threshold by entering a first charging state, and to respond to a condition that a voltage of the battery satisfies a deep discharge threshold by entering a second charging state; and
a fuel gauge circuit operably coupled to the battery charger circuit, the battery, and the deep discharge controller circuit, the fuel gauge circuit operable to respond to a condition that the voltage of the battery does not satisfy a fuel gauge threshold by supplying the trickle current in a burst to the battery, and to respond to a condition that the voltage of the battery satisfies the fuel gauge threshold by supplying the trickle current continuously to the battery.

11. The device of claim 10, wherein the deep discharge controller circuit comprises a current source operably coupled to at least one of the battery charger and the fuel gauge.

12. The device of claim 10, wherein at least one of the battery charger and the deep discharge controller is further operatively coupled to a system input node.

13. The device of claim 10, wherein the battery charger and the deep discharge controller are further operatively couplable to an external power adapter.

14. The device of claim 10, wherein the deep discharge controller circuit and the fuel gauge circuit are further operably coupled to an embedded controller.

15. The device of claim 10, wherein the battery charger circuit is operable to obtain charging power, enter a first charging state, and enter a second charging state.

16. The device of claim 10, wherein the deep discharge controller circuit is further operable to obtain a charging command and activate a trickle current.

17. The device of claim 10, wherein the fuel gauge circuit is further operable to enter a first charging state and enter a second charging state.

18. A system comprising:
a battery charger operable to obtain charging power from a power source;
a deep discharge controller operable to obtain a charging command, to activate a trickle current to a battery, to respond to a condition that a voltage of the battery does not satisfy a deep discharge threshold by entering a first charging state, and to respond to a condition that a voltage of the battery satisfies a deep discharge threshold by entering a second charging state; and
a fuel gauge circuit operable to respond to a condition that the voltage of the battery does not satisfy a fuel gauge threshold by supplying the trickle current in a burst to the battery, and to respond to a condition that the voltage of the battery satisfies the fuel gauge threshold by supplying the trickle current continuously to the battery.

* * * * *